United States Patent [19]

Holmes

[11] Patent Number: 4,941,889

[45] Date of Patent: Jul. 17, 1990

[54] BARBECUE FLAVORING BLOCKS

[76] Inventor: Emerson B. Holmes, 1419 N. Gardner St., Los Angeles, Calif. 90046

[21] Appl. No.: 354,309

[22] Filed: May 22, 1989

[51] Int. Cl.⁵ ........................... C10L 5/00; C10L 5/14
[52] U.S. Cl. ....................................... 44/590; 44/606; 44/545
[58] Field of Search ............... 44/15 R, 590, 606, 542, 44/545

[56] References Cited

U.S. PATENT DOCUMENTS 2,341,377  2/1944  Hinderer ............................. 44/15 R Primary Examiner—Carl F. Dees

[57] ABSTRACT

Barbecue flavoring blocks and a process for making barbecue flavoring block made from pieces of wood suitable to flavor food bound together with gelatin, preferably containing a flavoring ingredient. The flavoring blocks are pasturized.

14 Claims, No Drawings

4,941,889

BARBECUE FLAVORING BLOCKS

BACKGROUND OF THE INVENTION

1. Field of the Invention

This invention relates to barbecuing, particularly flavor additives for barbecuing.

2. Prior Art

There is a recognized need to provide means for flavoring food cooked in barbecue ovens and the like. Certain woods—for example, hickory—impart a particularly delicious flavor to foods cooked in their smoke. In an effort to provide foolproof methods of flavoring barbecue cooked foods with such smoke, several solutions have been suggested.

U.S. Pat. No. 2,916,365 to Smith discloses a barbecue fuel prepared by coating a fuel element—for example, wood—with an adhesive, and then coating the adhesive with powdered charcoal. The resulting fuel burns more slowly than the uncoated wood, allowing better utilization of the flavor in the wood.

U.S. Pat. No. 4,102,653 issued to Simmonds discloses briquettes of wood that are treated to eliminate flaming and control combustion.

One problem common to all the blocks made by these various problems is bacteria and fungi. Bacteria and fungi can destroy the aromatic constituents of the flavoring blocks and add bad tasting and potentially poisonous products in their place. Another problem is that all previous blocks are dry, and the smoke they produce is fairly moisture free. Moisture is desirable since many flavoring agents are readily steam distillable.

U.S. Pat. No. 3,709,700 to Ross discloses a smoke flavoring additive. A desired flavoring agent is mixed with an adhesive and applied to the outside surface of either wood or charcoal fuel elements.

In both of these disclosures, the additive is applied to the outside of the fuel element. Although the existence of the coating may slow the combustion of the fuel element, once the coating is gone, the element will burn as rapidly as an uncoated element. Furthermore, if a flavor ingredient has been added to the coating, once the coating has burned, the flavor is gone.

The inventor has discovered a new method of flavoring for barbecue cooking.

SUMMARY OF THE INVENTION

This invention provides barbecue flavoring blocks made from pieces of wood suitable to flavor food bound together with glue containing a flavoring ingredient. At least some of the glue is on the inside of the block.

An aspect of this invention is a process for making flavoring blocks:
(a) dissolving hard gelatin in water at between 30° C. and 100° C.;
(b) adding wood pieces;
(c) pasturizing the covered mixture under pressure at between 100° C. and 300° C.;
(d) cooling the mixture to 0° C. and 30° C.,
(e) shaping blocks from the mixture; and
(f) coating the blocks with a protective coating.

A further aspects of this invention are barbecue flavoring blocks comprising:
wood pieces;
gelatin binder holding the piece together; water absorbed into the wood pieces; said wood pieces, gelatin, and water pasteurized to destroy any bacteria or fungi present; and
a protective coating, wherein at least 50 percent of the weight of the finished wood blocks is water;
said wood pieces and gelatin molded into pieces covered with protective coating.

DETAILED DESCRIPTION OF THE INVENTION

Several woods are known to give particularly desirable flavor to barbecue when burned for fuel as the wood or charcoal. These include hickory, mesquite, and the like. In this invention, pieces of the wood can be cut into formed pieces, or used as randomly-shaped pieces. The size can range from chips having an approximate size of $0.5 \text{ cm} \times 0.5 \text{ cm} \times 2.0 \text{ cm}$ to fine sawdust. In the practice of this invention, different varieties of pieces of wood can be mixed together, thereby achieving unique flavors.

The pieces of wood are bound together with binding gelatin. Preferred binding gelatins are hard gelatin. Hard gelatin is defined as that having a bloom value of greater than 200 bloom.

In the practice of this invention water is heated to between 30° C. and 100° C., preferably between 75° C. and 85° C. The hard gelatin is added. When all the gelatin is dissolved, the wood pieces and any other desired flavoring ingredients are added. The mixture is then covered and heated under pressure to between 100° C. and 300° C., preferably between 190° C. and 210° C. for between 2 and 6 hours, preferably between 3 and 5 hours. The heating should be sufficient to kill any bacterial or fungal spores.

A spice or flavoring can be added to the heated mixture. The spice or flavoring can be a powdered spice or flavoring, or a liquid concentrate. The spice or flavoring is used to add an extra aroma and flavor to the smoke that flavors the cooked food. The spice can be any conventionally used spice in cooking foods, including allspice, bay leaves, celery, cumin, chili, cloves, cinnamon, coriander, curry, cayenne, dill, ginger, marjoram, nutmeg, oregano, paprika, various peppers, rosemary, sage, thyme, tumeric, taragon, and the like. The primary consideration for a spice or flavoring useful in this invention is that it must impart an aroma to the smoke as the blocks of the present invention burn.

The wood pieces are allowed to cool to between about 5° C. and 0° C. When the entire batch has cooled, the wood and gelatin binder mixture can be shaped into convenient sized pieces, for example, about $5 \text{ cm} \times 5 \text{ cm} \times 2.5 \text{ cm}$ for use. The shaped pieces are then covered with an outer protective layer. The layer can be resin, or similar substances, but 300 bloom gelatin is the preferred coating.

The pieces of wood are bound with gelatin as an adhesive. When burned, the flavoring from the spicy binder is continuously released into the aromatic woodsmoke. The cooked food is therefore continuously surrounded by an aromatic smoke. The precise flavor imparted to the cooked food can be varied by changing the woods used or by changing the spice composition in the binder. Such experimentation and optimization is well within the skill of the art.

The gelatin and wood pieces are pasteurized at between 100° C. and 300° C. One problem with previous wood blocks has been that bacteria and fungi would be present in the finished blocks. These microbes would destroy the flavorings added to the wood blocks and sometimes add a distasteful flavor of their own. This limited the shelf life of conventional barbeque flavoring blocks. The pasturization step kills whatever microbes or microbial spores that might be present, thereby allowing the blocks to have unlimited shelf life.

The protective coating of gelatin or resin or the like substantially prevents recontamination of the block. After the block has been coated, the blocks can be vacuum packaged, or otherwise suitably packaged for sale.

The blocks of the present invention can be used in several different ways. They can be added directly to a burning bed of charcoal or an indirectly heated bed of ceramic heat transfer blocks and slowly consumed. They can also be placed in a separate drawer or location and be indirectly heated. Indirect heat is especially preferred when the heat source for cooking is gas or electric. In one use, the blocks may be placed directly on the heating coils in an electric oven. It is preferred that the blocks receive an insufficient source of oxygen during combustion, so they do not burn, but smoke instead.

EXAMPLE 180 grams of 300 bloom gelatin (obtained from, for example, Sigma Chemical Company, St. Louis, Mo. 63128 USA) is added to four liters of water at a temperature of 82° C. in a pressure vessel. After the gelatin has completely dissolved three kilograms of hickory wood chips, approximately 0.5 cm×0.5 cm×2.0 cm and smaller is added. Then the pressure vessel is closed and the temperature raised to 200° C. for four hours. When the heat is removed, the mixture is cooled to 5° C. When the internal temperature of the mixture is 5° C., the mixture is shaped into 5 cm×5 cm×4.5 cm blocks. The blocks are covered with an outer layer of 300 bloom gelatin, prepared by dissolving 200 grams of 300 bloom gelatin in four liters of water. The coated blocks are then vacuum packaged for sale.

Second blocks are made by simply mixing wood chips together with gelatin and shaping the resultant mixture into blocks.

The first blocks weigh about 110 grams apiece, but similarly sized second blocks weigh about 30 grams apiece. The difference in weight is primarily due to difference in retained water in the wood chips. The first blocks are virtually sterile, whereas the second blocks have bacteria and fungi that can be cultured out by standard techniques. The first blocks provide copious amounts of moist, flavored vapors for flavoring food. The amount of water allows easy freeing of steam distillable flavoring ingredients. The second block provides a much drier and less flavorful smoke.

I claim:
1. A process for making flavoring blocks:
    (a) dissolving hard gelatin in water at between 30° C. and 100° C.;
    (b) adding wood pieces;
    (c) pasturizing the covered mixture under pressure at between 100° C. and 300° C.;
    (d) cooling the mixture to 0° C. and 30° C.,
    (e) shaping blocks from the mixture; and
    (f) coating the blocks with a protective coating.
2. The process of claim 1, wherein the binder gelatin in step (a) is 300 bloom gelatin.
3. The process of claim 1, including the step of adding flavorings in step (b).
4. The process of claim 1, wherein the temperature in step (c) is within the range of 190° C. and 210° C.
5. The process of claim 1, wherein the temperature in step (d) is between 0° C. and 10° C.
6. The process of claim 1, wherein in step (f) the blocks are coated with pitch resin.
7. The process of claim 1, wherein in step (f) the blocks are coated with 300 bloom gelatin.
8. The product of the process of claim 1.
9. Flavoring blocks comprising:
    wood pieces;
    gelatin binder holding the piece together;
    water absorbed into the wood pieces; said wood pieces, gelatin, and water pasturized to destroy any bacteria or fungi present; and
    a protective coating, wherein at least 50 percent of the weight of the finished wood blocks is water;
    said wood pieces and gelatin molded into pieces covered with the protective coating.
10. The blocks of claim 9, wherein the gelatin binder is hard gelatin.
11. The blocks of claim 10, wherein the gelatin is 300 bloom gelatin.
12. The blocks of claim 9, including added spice.
13. The blocks of claim 9, wherein the protective coating is hard gelatin.
14. The blocks of claim 13, wherein the hard gelatin is 300 bloom gelatin.

* * * * *